United States Patent [19]

Saito

[11] 3,956,452

[45] May 11, 1976

[54] DRY-TYPE ISOSTATIC PRESSING METHOD INVOLVING MINIMIZATION OF BREAKS OR CRACKS IN THE MOLDED BODIES

[75] Inventor: Shinroku Saito, Yokohama, Japan

[73] Assignee: Shinagawa Firebrick, Co., Ltd., Tokyo, Japan

[22] Filed: Aug. 16, 1973

[21] Appl. No.: 389,053

[52] U.S. Cl. .................................. 264/89; 264/93; 264/109; 264/314; 264/DIG. 50; 425/405 H; 425/437; 425/DIG. 14; 425/DIG. 44

[51] Int. Cl.[2] ........................ B28B 3/00; B28B 7/32; B29C 6/00

[58] Field of Search ............... 264/314, 88, 89, 109, 264/334, 335, DIG. 50, 93; 425/405 H, DIG. 12, DIG. 14, DIG. 44, 269

[56] References Cited

UNITED STATES PATENTS

| | | | |
|---|---|---|---|
| 2,290,910 | 7/1942 | Jeffery | 425/405 H |
| 2,320,583 | 6/1943 | Forro | 425/269 |
| 2,517,902 | 8/1950 | Luebkeman | 264/314 X |
| 3,038,199 | 6/1962 | Bartow et al. | 425/DIG. 44 |
| 3,172,153 | 3/1965 | Loomis et al. | 264/314 X |
| 3,239,591 | 3/1966 | Wendt | 425/405 H X |
| 3,354,245 | 11/1967 | Foster | 264/314 X |
| 3,454,997 | 1/1969 | Ligon et al. | 425/405 H |
| 3,470,284 | 9/1969 | Hartmann | 264/314 X |
| 3,499,066 | 3/1970 | Murray | 264/314 X |
| 3,520,961 | 7/1970 | Suda et al. | 264/314 X |
| 3,561,079 | 2/1971 | Anderson | 425;264/405 H;314 X |
| 3,593,373 | 7/1971 | Loomis | 425/405 H UX |
| 3,613,157 | 10/1971 | Landa et al. | 425/405 H UX |
| 3,618,179 | 11/1971 | Anderson et al. | 425/405 H |
| 3,635,616 | 1/1972 | Venkatesan | 264/314 X |
| 3,664,799 | 5/1972 | Wallick et al. | 425/405 H UX |
| R20,460 | 8/1937 | Jeffery | 264/314 X |

FOREIGN PATENTS OR APPLICATIONS

| | | | |
|---|---|---|---|
| 196,587 | 7/1967 | U.S.S.R. | 425/405 H |

*Primary Examiner*—Philip Anderson
*Attorney, Agent, or Firm*—Beveridge, Degrandi, Kline & Lunsford

[57] ABSTRACT

A method for avoiding cracking of the molded body during the decompression step in an isostatic pressing method of molding. The powders to be molded are housed in a shaping rubber mold, are molded under pressure, and the improvement is characterized by supplying forcibly gas between the outer peripheral surface of a molded body or a shaping thin rubber bag where the molded body is housed and the inner peripheral surface of the shaping rubber mold, the gas having a pressure higher than the isostatic pressure applied to the shaping rubber mold at the time when the shaping rubber mold begins to restore to its original state during the decompression step of the method. An apparatus for the said compression molding which is equipped with a specially designed pressure gas inletting device.

5 Claims, 2 Drawing Figures

DRY-TYPE ISOSTATIC PRESSING METHOD INVOLVING MINIMIZATION OF BREAKS OR CRACKS IN THE MOLDED BODIES

BACKGROUND OF THE INVENTION

1. Field of the Invention

This invention relates to a dry type isostatic pressing method, and more particularly to the improvement thereof characterized by supplying forcibly gas between the outer peripheral surface of a molded body or a shaping thin rubber bag where the molded body is housed and the inner peripheral surface of the shaping rubber mold, and the gas having a pressure higher than the isostatic pressure applied to the shaping rubber mold at the time when the said shaping rubber mold begins to restore to its original state during the decompression step thereof, as well as to an apparatus therefor.

2. Description of the Prior Art

In this kind of isostatic pressing, powders to be molded which have been packed in a rubber mold are compressed and molded in the presence of a isostatic pressure imparted to the rubber mold, and the isostatic pressing has often been utilized in the formation of pottery articles, fire bricks, ceramic moldings, etc. However, starting molded bodies for forming these articles have, in general, low tensile strength and low modulus of elasticity, and so some defects have been inevitable in the molding step thereof such that molded bodies are broken or cracks in the form of round slices occur in the molded bodies, when the molded bodies are released from the rubber mold during the decompression step, particularly in case of shaping long and slender columns.

Our experiments have clarified the following facts: In the molding operation according to the isostatic pressing, in general, the rubber mold in the apparatus is gradually compressed, and after the isostatic pressure has reached a desired one, the pressure is kept as such for a predetermined period of time, and thereafter the step transfers to the decompression step, while a non-compressible fluid such as oil, water or the like is used as a pressure medium, and so when the step has transferred to the decompression step, the rubber mold is restored to the original state thereof by the aid of the elastic force of the rubber mold itself at almost the termination of the reduced pressure step, without any rapid restoration corresponding to the rapid reduced pressure effect. In the restoration of the rubber mold, the restoring timing in the direction of the axis of the mold is earlier than that in the perpendicular direction thereof, in other words, the restoration of the rubber mold in the axis direction thereof is effected in such a state that a pressure is imparted to the molded body in the perpendicular direction of the axis thereof, and thus, a friction occurs between the surface of the rubber mold and that of the shaped molding and the resulting friction power on the surface of the molded body acts on the said surface as a tension. On these grounds, the molded body is broken or cracks occur therein. In addition, it also has been clarified that the more the shaping rubber mold thickens, the more the said tension increases.

In order to eliminate the said drawbacks, for example, such a means has heretofore been taken that powders to be molded are put in a thin rubber bag so as to evade the direct contact between the powders and the rubber mold, an antifriction agent is coated on the outer surface of the rubber bag. However, said means inevitably causes some drawbacks such that the operation step is complicated and the rubber mold is tainted or damaged by the coating of the antifriction agent.

SUMMARY OF THE INVENTION

The object of the present invention is to provide an improved dry type isostatic pressing method which is free from the above mentioned drawbacks occurred during the releasing step of the molded bodies in the prior art techniques, characterized in that gas is supplied forcibly between the outer peripheral surface of a molded body or a shaping thin rubber bag where the molded body is housed and the inner peripheral surface of a shaping rubber mold during a decompression operation step in the isostatic pressing so as to form a vapor phase therebetween, said having a pressure higher than the isostatic pressure applied to the shaping rubber mold at the time when the shaping rubber mold begins to restore to its original state, as well as an apparatus for attaining the isostatic pressing.

The above and other objects, merits and features of the present invention will be apparent in detail from the following description in conjunction with the accompanying drawings.

DETAILED DESCRIPTION OF THE PREFERRED EMBODIMENTS

Figure 1:
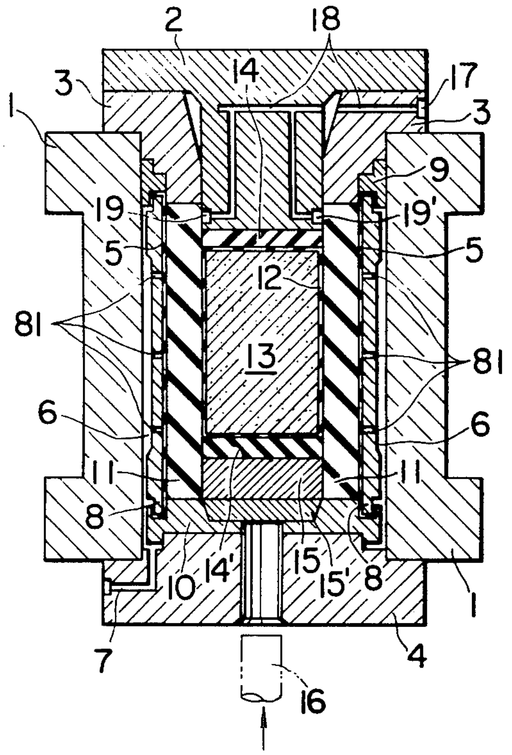
FIG. 1 shows a longitudinal section of a dry apparatus which is one embodiment of the present invention.

Reference is now made to FIG. 1, numeral 1 is a cylindrical high pressure container of an apparatus for dry type rubber compression molding of the present invention, and both the upper and lower open parts of the container 1 are firmly blocked up with an upper inner lid 2, an upper outer lid 3 and a lower lid 4. In the interior of the container 1 a shaping rubber mold 11 is disposed in coaxial with the container 1, and the shaping rubber mold 11 and the above described upper and lower lids 2, 3 and 4 define a sealed molding chamber where powders is formed in a molded body. At the outside of the shaping rubber mold 11 a pressing rubber mold 5 is disposed also in coaxial, and further a rigid metallic spacer is disposed around and adjacent to the rubber mold 5 so as to set effectively the rubber mold 5. A isostatic liquid chamber 6 is constantly formed between the outer periphery of the spacer 8 and the inner peripheral wall of the container 1, and upper and lower pressure rubber stoppers 9 and 10 are fixed on the upper and lower sides of the spacer 8 and the pressing rubber mold 5, respectively. Numeral 12 a shaping thin rubber bag wherein powders to be molded 13 are housed, 14 and 14′ upper and lower rubber plates, 15 a metal spacing-out plate, 15′ a supporting plate, and 16 a knock-out rod. The said shaping thin rubber bag is not always necessary.

In the lower lid 4 is provided a pressure fluid passage 7, which is connected with the above mentioned liquid pressure chamber. In the upper outer lid 3 is provided a gas inlet 17, and a gas passage 18 which is connected with said inlet 17 is provided through the interior of the upper outer lid 3 and the inner lid 2. The gas passage 18 has openings 19 and 19' formed to face the inner wall of the above mentioned shaping rubber mold 11.

The upper and lower pressure rubber stoppers 9 and 10 are disposed on the upper and lower ends of the pressing rubber mold 5, respectively, so as to prevent the pressurized isostatic liquid in the isostatic liquid chamber 6 from penetrating into the molding chamber with receiving the depressing force from the the upper outer lid 3 and the lower lid 4. Upper and lower rubber plates 14 and 14' disposed to the upper and lower sides of the powders to be molded 13 serve to act almost the same effect as the isostatic pressure under a high pressure, that is, the powders to be molded are compressed also in the axial direction thereof due to the said plates, whereby an isostatic pressure is as a whole imparted to the said powders.

The metal spacing out plate 15 serves to control or adjust the size of the molded body.

In this dry type isostatic pressing apparatus, a fluid is fed under pressure in the isostatic liquid chamber 6, a pressure is then imparted thereto (compression step), the pressing rubber mold 5 is thus compressed isostatically in this compression step whereby the powders to be compressed and molded are compressed through the pressurizing rubber mold 5 and the shaping rubber mold 11, as shown in the FIG. 1, and after the said powders have been molded to form the molded body, the pressure in the isostatic liquid chamber 6 is then reduced (decompression step). Thereafter, the pressure is continuously reduced, consequently the shaping rubber mold 11 begins firstly to restore to its original state in the axial direction thereof with occurrence of a friction between the surface of the molded body or the shaping thin rubber bag 12 and that of the shaping rubber mold 11, and owing to further continuous redudction of the pressure, the shaping rubber mold 11 begins next to restore in the direction perpendicular to the axis of the said rubber mold 11, at this time the shaping rubber mold 11 begins to release from the molded body or the shaping thin rubber bag 12. Before the isostatic pressure of the isostatic liquid chamber 6 is lowered to the pressure $P_3$ at which the shaping rubber mold 11 begins to be restored in the axial direction, gas, for example, air or an inert gas, having a pressure $P_2$ higher than the pressure $P_3$ is blown between the inner peripheral surface of the shaping rubber bag 12. When the shaping thin rubber bag 12 is not used, the gas is blown between the inner peripheral surface of the shaping rubber mold 11 and the peripheral surface of the molded body.

The time when the gas is to be blown is well if the gas may be blown until the isostatic pressure of the isostatic liquid chamber 6 is reduced to that at which the shaping rubber mold 11 begins to restore in the axial direction during the decompression step, that is, to the above described pressure $P_3$. Whereas, in order to evade any mistake in operation it is better to begin to blow the gas at the time when the isostatic pressure for the molding has reached to the maximum value, as shown in FIG. 2.

Figure 2:
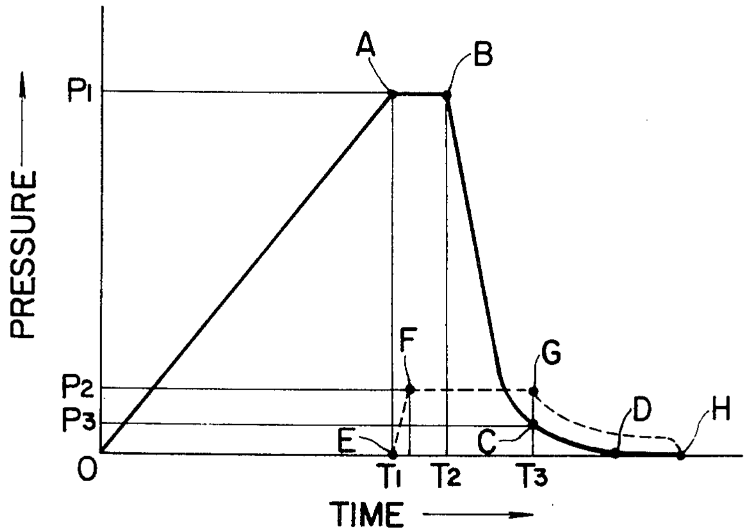
FIG. 2 is a graph showing the pressure variation of the isostatic pressure and the pressure of gas, which is supplied between the outer peripheral surface of a molded body or a shaping thin rubber bag where the molded body is housed and the inner peripheral surface of a shaping rubber mold, on a lapse of time.

The FIG. 2 is a graph showning the pressure variation of the isostatic liquid pressure which is accumulated into the isostatic liquid chamber 6, and the pressure of the gas, which is supplied between the outer peripheral surface of the rubber bag 12 or the molded body and the inner peripheral surface of the shaping rubber mold via the inlet 17, the passage 18 and the openings 19 and 19' on the lapse of time, and an explanation thereto will be given hereinafter.

In co-ordinates where the longitudinal axis is pressure and the horizontal axis is time, the line OABD shows the isostatic pressure conditions in the interior of the isostatic liquid chamber 6, which varies with the lapse of time, and more precisely, the isostatic pressure in the isostatic liquid chamber 6 is firstly rised to a predetermined pressure $P_1$ in the compression step as indicated by a line OA, and then the pressure $P_1$ is kept as such for a predetermined period of time, from $T_1$ to $T_2$, as indicated by a line AB, and thereafter the pressure is rapidly reduced, along a curve BD. In the point C on this curve BD showing the decompression step in the isostatic pressing of this invention, the shaping rubber mold 11 begins to restore actually to its original state, whereupon the isostatic pressure in the isostatic liquid chamber 6 is indicated by $P_3$ and the time of the point C is as indicated by $T_3$.

On the other hand, the variation of the pressure of the gas on the lapse of time is as shown by a dotted line EFGH in the same FIG. 2. More precisely, the time for beginning to pressurize the gas corresponds to the time $T_1$ when the isostatic pressure in the isostatic liquid chamber has reached to the maximum pressure $P_1$, and the pressure for introducing the gas is rised up to a predetermined pressure $P_2$ as indicated by a line EF, and then thus rised pressure $P_2$ is maintained in the pressure $P_2$ for a predetermined period as indicated by a dotted line FG. It is a matter of course that the pressure $P_2$ must be higher than the isostatic pressure $P_3$ of the point C when the shaping rubber mold 11 begins to restore actually to its original state. Therefore, the gas is supplied between the inner peripheral surface of the shaping rubber mold 11 and the outer peripheral surface of the shaping thin rubber bag 12 or the molded body at the time when the isostatic pressure is reduced to the pressure $P_2$ of the point C, that is, when the shaping rubber mold 11 begins to restore to its original state. Continuously, after the isostatic pressure is further reduced to the pressure of zero as indicated by the point D in FIG. 2, the gas is discharged therefrom.

Thus, in the method of this invention, the shaping rubber mold 11 is forcedly released from the molded body or the shaping thin rubber bag by the action of the pressure of the gas, such as, air or inert gas, for example, $N_2$ or Ar, etc., before the mold 11 begins to restore to its original state by the elastic force of the mold 11 itself, occurrence of the friction between the inner peripheral surface of the mold 11 and the outer peripheral surface of the bag 12 or the molded body can be therefore prevented.

In addition, it is necessary in the actual practice of the present invention to previously learn the relation between (a) the variation of the pressure during the compression step and the decompression step, which is based upon the variation of the size and the quality of the shaping rubber mold, and (b) the degree of the deformation of the said rubber mold. It may easily be solved by providing some conventional detecting means, such as a strein gauge, etc., in some appropriate portions on the inner or outer peripheral surface of the shaping rubber mold.

As apparent from the above explanation, the main object of the present invention is to prevent a molded body from being broken or cracked, by forming forcedly a gaseous layer between the inner peripheral surface of the shaping rubber mold and the outer peripheral surface of the molded body or the shaping thin rubber bag where the molded body is housed therein at a determined time during the decompression step in the isostatic pressing operation whereby the molded body may not be affected by the restoration of the shaping rubber mold.

The merits of the present invention are substantiated by the following Example:

EXAMPLE

Calcined alumina granules having an average particles size of 100 μ (diameter) are put in a thin rubber bag, and the pressure in the molding apparatus is gradually elevated at last to reach the desired maximum pressure 2 t/cm$^2$ after 60 seconds, and thereafter the maximum pressure is kept as such for 10 seconds thereby to shape a square pillar (150 mm × 150 mm × 450 mm). Before the reduced pressure operation step to follow, a compressed air (7 kg/cm$^2$) is prepared and the said compressed air is blown between the shaping rubber mold and the thin rubber bag, with reduction of the pressure therein, via the fluid inlet, passage and openings of the apparatus, thereby to form a thin layer of air. With proceeding of the reduction of the pressure in the apparatus, the inner pressure reaches the restoration pressure (about 6 kg/cm$^2$) of the shaping rubber mold whereupon the shaping fluid pressure becomes zero. Afterwards, the compressed air (7 kg/cm$^2$) is further kept blown for 20 seconds, and then the pressure of the air is reduced and exhausted. In the alumina square pillar thus molded according to the process, the degree of occurrence of cracks during the molding thereof is 5% or less. Thus, it is well substantiated that the process of the present invention has a remarkable merit in view of the fact that the moldings prepared according to the other conventional molding methods have serious cracks therein. The molding thus shaped in the present process may be calcined at any desired temperature by means of any conventional methods to obtain a desired shaped article.

What is claimed is:

1. In a dry-type isostatic pressing method wherein powders are formed into a molded body by housing said powders in the interior of a shaping rubber mold, applying isostatic pressure to said rubber mold to compress said powders and form said molded body, and rapidly decreasing and finally removing said isostatic pressure to decompress said rubber mold and restore it to its original state, the improvement comprising introducing gas under pressure between the outer peripheral surface of said molded body and the inner peripheral surface of said shaping rubber mold during said decompression step, said gas under pressure being introduced as a sheet of fluid which sheet is parallel to said outer peripheral surface and over the entire surface area of said outer peripheral surface, and said pressure being higher than said isostatic pressure at the time when said shaping rubber mold begins to restore to its original state.

2. The method as claimed in claim 1 wherein said powders are contained in a shaping thin rubber bag which is housed in the interior of said shaping rubber mold and wherein said gas under pressure is introduced as a sheet of fluid between the exterior surface of said rubber bag and the inner peripheral surface of said shaping rubber mold and which sheet is parallel to said bag and mold.

3. The method as claimed in claim 1, wherein said gas is air.

4. The method as claimed in claim 1, wherein said gas is an inert gas.

5. The method as claimed in claim 1 wherein said gas under pressure is first introduced when said isostatic pressure first reaches its maximum value.

* * * * *